Sept. 10, 1929.    J. B. RAVIOLO    1,727,841
CLUTCH PLATE
Filed Aug. 31, 1927
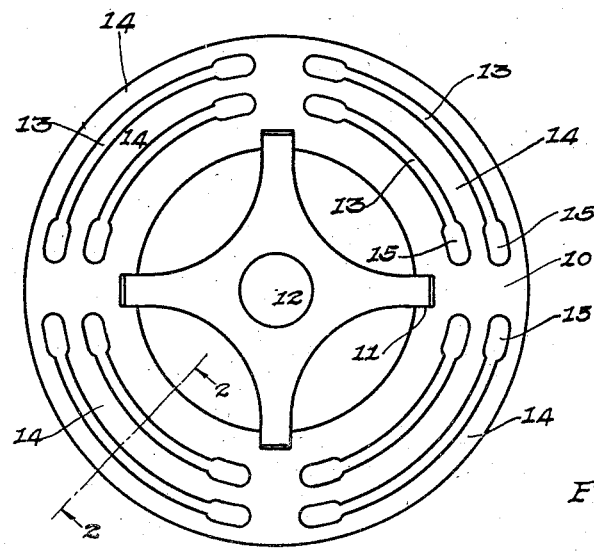
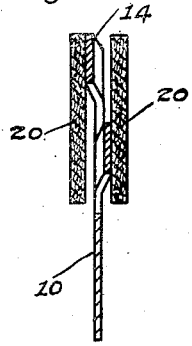
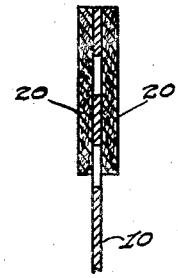
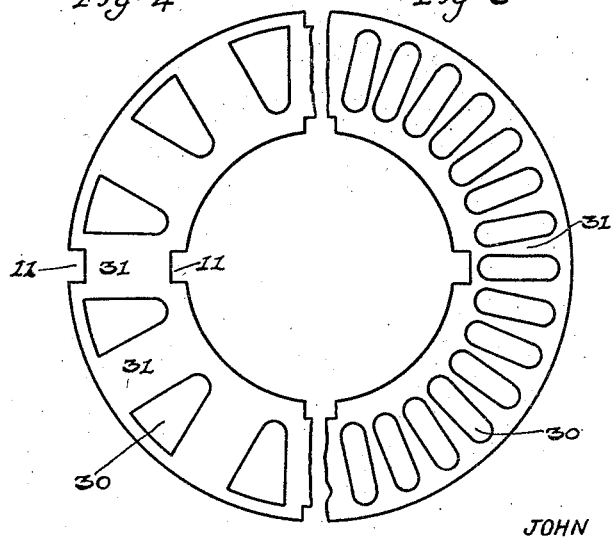
JOHN B RAVIOLO.
INVENTOR
HIS ATTORNEY Patented Sept. 10, 1929.

1,727,841

UNITED STATES PATENT OFFICE.

JOHN BAPTIST RAVIOLO, OF HIGHLAND PARK, NEW JERSEY.

CLUTCH PLATE.

Application filed August 31, 1927. Serial No. 216,826.

My invention relates to an improved friction plate for use as either a driving or driven plate in a clutch for the transmission of power, and has for its object to provide a clutch plate having substantially continuous resilient pressure surface, designed so as to control the resiliency of the plate regardless of the thickness thereof thereby being able to distribute gradually the pressure on the entire friction surface.

A further object is to provide a clutch plate provided with friction mats mounted to exert a slight initial pressure on only a portion of the friction surfaces as the gripping plates first contact with the clutch plate and to contact uniformly with the gripping surfaces throughout their entire contact surface as the plates have become engaged under full working pressure.

A further object is to provide a plate of simple design and economical of structure.

The foregoing and other features of my invention will now be described in connection with the accompanying drawing forming part of this specification in which I have represented my clutch plate in its preferred form after which I shall point out more particularly in the claims those features which I believe to be new and of my own invention.

In the drawings:

Figure 1 is a plan view of my clutch plate embodying a preferred form of my invention and a driven or transmission shaft on which the plate may be mounted from its inner periphery.

Figure 2 is a section along the line 2—2 of Figure 1 when the plate is in released position.

Figure 3 is a similar section showing the relation of the parts when the friction surfaces are engaged.

Figures 4 and 5, show modifications in the slots and sections of plates which I may employ.

In the carrying out of my invention I provide a plate or ring 10 provided with slots 11 or other engaging means to receive a driven or transmission shaft 12. While these slots are shown located in the inside periphery of my plate they may also be located in the outside periphery. In case my friction plate is a driven plate I prefer the arrangement as illustrated, but when my friction plate is used as a driving plate the means of fastening would preferably be in the outside periphery.

As illustrated in Figure 1 the ring 10 is provided with a plurality of arcuate slots 13 which divide the plate into a plurality of segments 14. These segments are alternately disposed in planes on either side of the intermediate central plane of the clutch as indicated in Figure 2. Friction mats 20 in the form of a continuous ring or segments may be attached to the plate segments 14 on each side of the plate.

It will be observed that the ends of the slots 13 are enlarged as at 15 and the segments are thereby reduced in width. This provides for controlling the pressure required to deflect the segments. In other words, the resiliency of the plate can be controlled regardless of the thickness of the plate by regulating the size of these end openings.

When the clutch is engaged the segments flatten out until they assume the position shown in Figure 3 giving a continuous gripping surface circumferentially around the plate on both sides.

Referring to the modifications illustrated in Figures 4 and 5. The slots 30 may be radial or a combination of both radial and arcuate with the sections 31 between the slots 30 disposed in planes on either side of the intermediate or central plane of the clutch.

From the above description it will be evident that as the pressure plates are brought together the peripheral portion of my clutch plate is flexed or straightened. Due to the shape a very slight friction is exerted between the friction surfaces and the gripping plates at the beginning permitting a certain amount of slip which prevents the clutch from grabbing. As the gripping plates come closer together the peripheral portion is further flexed or straightened and finally assumes substantially the position shown in Figure 3, providing greater friction between the friction surfaces and gripping plates until the friction and gripping plates are locked together and rotate at the same speed. Through this arrangement a very gradual picking up of speed by the transmission shaft is insured with a minimum of mass of operating parts.

I wish it distinctly understood that my clutch plate herein illustrated and described is in the form in which I desire to construct it but that changes or variations may be made as may be convenient or desirable without departing from the salient features of my invention and I therefore intend the following claims to cover such modifications as naturally fall within the lines of invention.

I claim:

1. A clutch plate comprising a plate provided with a plurality of slots and intermediate sections, the sections being integral with the plate at both ends, the sections being disposed alternately in planes on either side of the plate.

2. The device of claim 1 with the addition that the slots are so formed that the resiliency of the plate may be regulated regardless of its thickness.

3. A clutch plate comprising a plate provided with a plurality of arcuate slots and intermediate segments, the segments being disposed alternately in planes on either side of the plate, and friction mats attached to the segments on either side of the plate.

JOHN BAPTIST RAVIOLO.